A. S. HUBBARD.
STORAGE BATTERY.
APPLICATION FILED SEPT. 3, 1919.

1,363,650.

Patented Dec. 28, 1920.

INVENTOR.
Albert S. Hubbard
BY Kenyon & Kenyon
ATTORNEYS.

UNITED STATES PATENT OFFICE.

ALBERT S. HUBBARD, OF NEW YORK, N. Y., ASSIGNOR TO GOULD STORAGE BATTERY COMPANY, OF DEPEW, NEW YORK, A CORPORATION OF NEW YORK.

STORAGE BATTERY.

1,363,650.    Specification of Letters Patent.    Patented Dec. 28, 1920.

Original application filed December 6, 1917, Serial No. 205,829. Divided and this application filed September 3, 1919. Serial No. 321,308.

*To all whom it may concern:*

Be it known that I, ALBERT S. HUBBARD, a citizen of the United States, and residing in the borough of Manhattan, city, county, and State of New York, have invented certain new and useful Improvements in Storage Batteries, of which the following is a specification.

The particular novel features of my invention are set forth in the annexed claims.

This invention relates to improvements in the construction of storage batteries and in particular to a novel manner of suspending the battery plates such that vertical alinement is obtained of the plates of one polarity relative to those of the opposite polarity. These novel features have been already shown and described in my copending application Serial No. 205829 filed December 6th, 1917, of which the present application is a division.

The invention is illustrated in the accompanying drawings in which.

Figure 1:
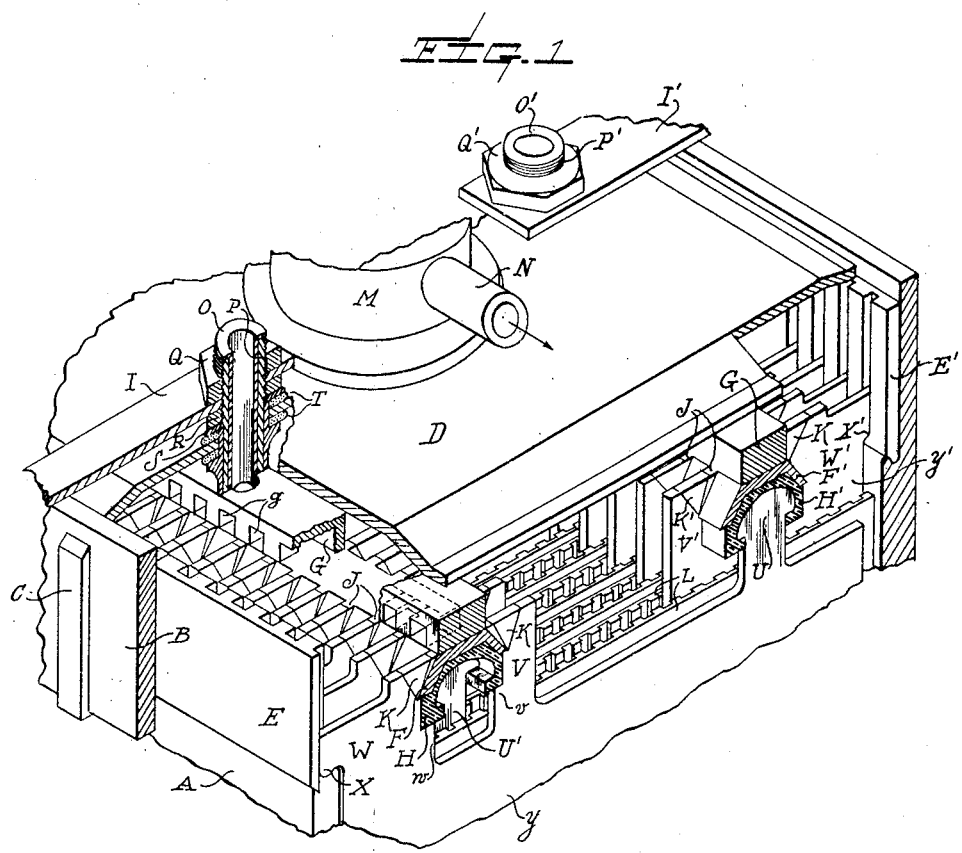
Figure 1 is a perspective view of a storage battery cell, the jar and some of the other parts being cut away in places to show the details of the interior construction.

In Fig. 1, A represents the jar, constructed preferably of hard rubber compound or other suitable material. The jar is shown reinforced with horizontal and vertical strengthening members B and C. Any suitable means known in the art may be employed for further reinforcing these members. The material of the strengthening members may be of a different composition or formula from that used in the jar walls.

The spacing of the strengthening members and their sizes will be determined by the material used, by the jar size and other conditions.

The inside dimensions of the jar relative to the size of the plates, their number and spacing will be such as to permit of the necessary clearances as well as the necessary sediment space beneath the plates and the desired electrolyte and air space above the plates.

D represents the cover, cut away in places to show the interior of the cell. The cover is preferably constructed of hard rubber compound or other acid proof insulating material. The cover may also be constructed of acid proof metal such as lead or antimony-lead alloy. In case a metal cover is used, it will be necessary to insulate it from the terminal posts C and C' preferably by means of insulating bushings. The cover D is preferably provided with a depressed edge in which sealing compound can be poured thus sealing the cover to the jar. The cover shown is of the hard rubber compound type.

E and E' are supporting pieces for the lugs X and X' provided on the outer ends of the conducting lugs W and W' of the plates Y and Y'. These supporting pieces have no insulating function and hence can be cast of lead or antimony alloy to reduce the weight. However, I prefer to mold them of hard rubber compound. In case the supporting pieces E and E' and the cover D are both of metal, it will be necessary to provide insulation between the supporting pieces E and E' and the cover D. The bottoms of these supporting pieces are shown with downward extensions which by interlocking with correspondingly channeled ledges formed by the receding jar walls, insure the maintenance of alinement of the plate elements and the jar. The extensions and corresponding ledges shown in curved form may be of any desired shape so long as the lateral motion of the plate elements relative to the jar is thereby limited. These supporting pieces are slotted to take the outer ends X and X' of the plate lugs W and W', and each slot has at its bottom a depression forming a socket into which the corresponding projection X and X' extends, and by which it is fixed in position.

F and F' represent respectively the negative and positive bus bars. These bars are preferably made of the same material as the plate lugs or terminal ends W and W' and V and V', since a better joint is thereby obtained when the bus bars and plate lugs are joined by lead burning. The bus bars are provided with projections J and J' to insure alinement of the plates relative to the bus bars and to facilitate the lead burning operation. The parts K and K' represent those portions filled in by lead burning to unite the plate lugs with the bus bars.

Figure 2:
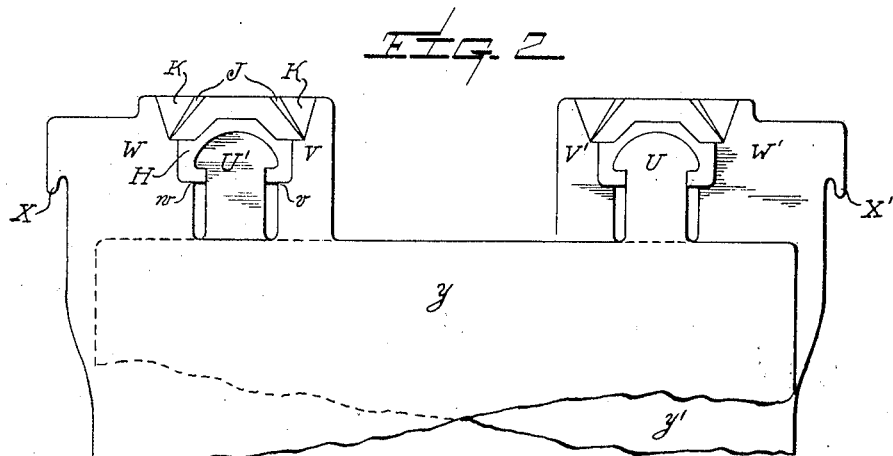
Fig. 2 shows in detail the support of the free plate ends.

H and H' are beaded channel bars made of insulating material, which are inserted transversely to the plates beneath the bus bars F and F', and are supported by the projections W and V respectively on the lugs W and W' and V and V' and in turn support in their respective channels the lugs W and W' of the adjacent plates located near the free ends of the plates. By these means also vertical alinement is obtained of the plates of one polarity relative to those of the opposite polarity. Fig. 2 shows the function of bars H and H' more detailed. The bars H and H' are preferably constructed of hard rubber compound although glass or other insulating material having the necessary strength may be used.

I and I' are the conductors, preferably of lead coated copper, provided to connect adjacent cells together. L, L represent the separators here shown as of the grooved wood type. Before they are used, these separators are preferably treated by immersion in a hot solution of caustic potash or caustic soda to remove substances liable to affect the plates. The separators are of the type usually employed with plates of the pasted type. The type of separator to be used is determined by the type of plates and the results desired. The battery plates Y which are shown as of the pasted type may also be of either the Planté or pasted type or a combination with for instance Planté positives and pasted negatives.

I claim:

1. A storage battery of the character described, comprising a jar containing positive and negative plates arranged in alternating sequence, each plate having a " free " end and a " terminal " end, the terminal ends of the positive and negative plates being grouped and connected together respectively at opposite ends of the jar, an insulating bar for each group embedded in its terminal ends but removable therefrom transversely to said plates, each bar being suitably shaped at its underside, said " free ends " having supporting lugs shaped reciprocally to the contour of the underside of said bars and adapted to interlock therewith for supporting in the jar the free plate ends by said bars, the lugs of one plate group interlocking with the bar embedded in the terminal ends of the other plate group.

2. A storage battery of the character described, comprising a jar containing positive and negative plates arranged in alternating sequence, each plate having a " free " end and a " terminal " end, the terminal ends of the positive and negative plates being grouped and connected together respectively at opposite ends of the jar, an insulating bar for each group embedded in its terminal ends but removable therefrom transversely to said plates, said bar having an inverted beaded channel, supporting lugs at the free ends of each plate group, conforming to the contour of said bar channel, the lugs of one plate group resting within the channel of the bar embedded in the terminal ends of the other plate group, when the plates are mounted in the jar.

3. A storage battery of the character described, comprising a jar containing positive and negative plates arranged in alternating sequence, each plate having a " free " end and a " terminal " end, the terminal ends of the positive and negative plates being grouped and connected together respectively at opposite ends of the jar, a separator element for each of said groups suitably supported by the jar wall and having grooves for the plate ends of its group, spaced apart the distance of two adjacent plates of that group, each groove having a socket seat at its lower portion to receive the correspondingly shaped end of the respective plate, said separator element thereby supporting and laterally and longitudinally fixing the terminal plate ends of its group.

4. A storage battery comprising a jar containing positive and negative plates each having a terminal and a free end, the terminal ends of the positive and negative plates being grouped and connected together respectively at opposite sides of the jar, a support for the free end of each group carried by the terminal end of the other group and removable transversely thereof, said supports having an upper and a lower supporting surface, and a projection on the free end of each plate arranged to engage the upper surface of each support.

5. A storage battery comprising a jar containing positive and negative plates each having a terminal and a free end, the terminal ends of the positive and negative plates being grouped and connected together respectively at the opposite sides of the jar, means for supporting the free ends of the plates comprising a mushroom shaped lug extending upwardly from the free end of each plate, an insulating support carried by the terminal end of the opposite group of plates and engaging both sides of the lugs on the free ends of the opposite group of plates.

6. A storage battery comprising a jar containing positive and negative plates each having a terminal and a free end, the terminal ends of the positive and negative plates being grouped and connected together respectively at opposite sides of the jar, a support for the free end of each group carried by the terminal end of the other group and removable transversely thereof, said supports having an upper and a lower supporting surface, and a projection on the free end of each plate through which the free end of the plate is supported by an upper surface of each support.

7. A storage battery comprising a jar containing positive and negative plates each having a terminal and a free end, the terminal ends of the positive and negative plates being grouped and connected together respectively at opposite sides of the jar, means for supporting the free ends of the plates comprising a lug extending upwardly from the free end of each plate, an insulating support carried by the terminal end of the opposite group of plates and supporting the lugs on the free ends of the opposite group of plates.

8. A storage battery comprising a suitable container with alternate positive and negative plates therein, the positive plates being connected together at the terminal end thereof and the negative plates being connected together at the terminal end thereof, and insulating means passing through the plates of both groups at the tops thereof and interlocking therewith to prevent one group from movement with respect to the other group except in a plane substantially at right-angles to the plane of the plates.

9. A storage battery comprising a suitable container with alternate positive and negative plates therein, the positive plates being connected together at the terminal end thereof and the negative plates being connected together at the terminal end thereof, and an insulating member extending transversely of the plates and interlocking with the plates of both groups at the tops thereof by being adapted to be supported by the plates of each group and to support the plates of each group from the other group.

10. A storage battery comprising a suitable container with alternate positive and negative plates therein, the positive plates being connected together at the terminal end thereof and the negative plates being connected together at the terminal end thereof, and two insulating members extending transversely of the plates, each member interlocking with the plates of both groups by being adapted to be supported by the plates of each group and to support the plates of each group from the other group.

11. A storage battery comprising a suitable container with alternate positive and negative plates therein, the positive plates being connected together at the terminal end thereof and the negative plates being connected together at the terminal end thereof, and two insulating members extending transversely of the plates, each member interlocking with the plates of both groups by being adapted to be supported by the plates of each group and to support the plates of each group from the other group, all of said plates being of similar contour.

12. A storage battery comprising a suitable container with alternate positive and negative plates therein, the positive plates being connected together at the terminal end thereof and the negative plates being connected together at the terminal end thereof, an insulating member passing transversely of the plates at the terminal side of the positive plates and interlocking with the plates of both groups so as to be removed from each group only by movement in a direction substantially at right-angles to the plates, and an insulating member passing transversely of the plates at the terminal side of the negative plates and interlocking with the plates of both groups so as to be removed from each group only by movement in a direction substantially at right-angles to the plates.

13. A storage battery comprising a suitable container with alternate positive and negative plates therein, the positive plates being connected together at the terminal end thereof and the negative plates being connected together at the terminal end thereof, and insulating means passing through the plates of both groups and interlocking therewith to prevent one group from movement with respect to the other group except in a plane substantially at right-angles to the plane of the plates, all of said plates being of similar contour.

In testimony whereof, I have signed my name to this specification.

ALBERT S. HUBBARD.